United States Patent
Gillot et al.

(10) Patent No.: US 10,410,444 B2
(45) Date of Patent: Sep. 10, 2019

(54) SYSTEM AND METHOD FOR ACCESS CONTROL

(71) Applicant: CommuniThings SA, Louvain-la-Neuve (BE)

(72) Inventors: David Gillot, Brussels (BE); Ann Demarche, Langdorp (BE); Itay Oren, Brussels (BE); Juan Hurtado, Madrid (ES)

(73) Assignee: COMMUNITHINGS SA, Louvain-la-Neuve (BE)

( * ) Notice: Subject to any disclaimer, the term of this patent is extended or adjusted under 35 U.S.C. 154(b) by 0 days.

(21) Appl. No.: 15/767,037

(22) PCT Filed: Oct. 12, 2016

(86) PCT No.: PCT/EP2016/074433
§ 371 (c)(1),
(2) Date: Apr. 9, 2018

(87) PCT Pub. No.: WO2017/064107
PCT Pub. Date: Apr. 20, 2017

(65) Prior Publication Data
US 2018/0293823 A1    Oct. 11, 2018

Related U.S. Application Data (60) Provisional application No. 62/240,316, filed on Oct. 12, 2015.

(51) Int. Cl.
*G07C 9/00* (2006.01)
*H04W 12/04* (2009.01)
*H04W 12/00* (2009.01)

(52) U.S. Cl.
CPC ..... *G07C 9/00103* (2013.01); *G07C 9/00309* (2013.01); *G07C 9/00571* (2013.01);
(Continued)

(58) Field of Classification Search
None
See application file for complete search history.

(56) References Cited

U.S. PATENT DOCUMENTS

| 8,768,565 B2* | 7/2014 | Jefferies | G07B 15/00 701/29.6 |
| 9,024,720 B2* | 5/2015 | Bliding | G07C 9/00103 340/5.8 |

(Continued)

FOREIGN PATENT DOCUMENTS

WO    WO-2012116037    8/2012

*Primary Examiner* — Carlos Garcia
(74) *Attorney, Agent, or Firm* — Marcus C. Dawes (57) ABSTRACT

A system for access control, said system comprising a plurality of mobile user devices, an access control device and an access control server, wherein said access control server is configured to send configuration data to said access control device by communicating over a Low Throughput Network, said configuration data comprising a distinct data element (RN-AP) and an authorization code (XRES-AP) for the access control device; said access control device is configured to receive said configuration data from said access control server by communicating over the Low Throughput Network; each mobile user device is configured to establish a communication channel with the access control device and to receive said distinct data element (RN-AP) over said communication channel; and to send a request containing the distinct data element in order for the access control device to receive a further authorization code (XRES-AP) determined by the access control server; and said access control device is configured to compare the received further authorization code with the authorization code previously received at the access control device from the access control server and to validate the access based on the result of the comparing.

20 Claims, 8 Drawing Sheets

(52) U.S. Cl.
CPC ..... *G07C 9/00817* (2013.01); *G07C 9/00904* (2013.01); *H04W 12/003* (2019.01); *H04W 12/04* (2013.01); *G07C 2009/00396* (2013.01); *G07C 2009/00769* (2013.01); *G07C 2009/00793* (2013.01); *G07C 2009/00825* (2013.01); *G07C 2209/02* (2013.01); *G07C 2209/63* (2013.01)

(56) References Cited

U.S. PATENT DOCUMENTS

| | | |
|---|---|---|
| 2006/0170533 A1* | 8/2006 | Chioiu ............... G07C 9/00103 340/5.61 |
| 2012/0115442 A1 | 5/2012 | Dadu |
| 2014/0028438 A1 | 1/2014 | Kuenzi |
| 2015/0228134 A1 | 8/2015 | Tehranchi |

\* cited by examiner

SYSTEM AND METHOD FOR ACCESS CONTROL

FIELD OF THE INVENTION

The field of the invention relates to a system and a method for access control, to a mobile user device for use in such a system, to an access control device for use in such a system and to an access control server for use in such a system.

BACKGROUND OF THE INVENTION

Access control is a common security requirement for entering private or public buildings, areas, parking, etc.

When the access control is automated, people usually receive a personal physical badge containing, a RFID or a NFC/MIFARE circuit enabling the access control system to authenticate the request and validate it against access policy rules. This is represented in the FIG. 1a. The procedure consists in approaching the badge 1 close to a badge reader 3. The badge reader 3 retrieves the assigned ID from the tag and transmits it to a back-end access control server 4. The access control server 4 checks the policy linked to the access controlled by the badge reader 3 and the access rights associated with the badge 1 and its owner. The access control server 4 allows the access by unlocking the door 5, opening the gate 5, etc. associated with the badge reader 3. This may be achieved by the badge reader 3 controlling an actuator 6 to open the door or gate 5.

Figure 1A:
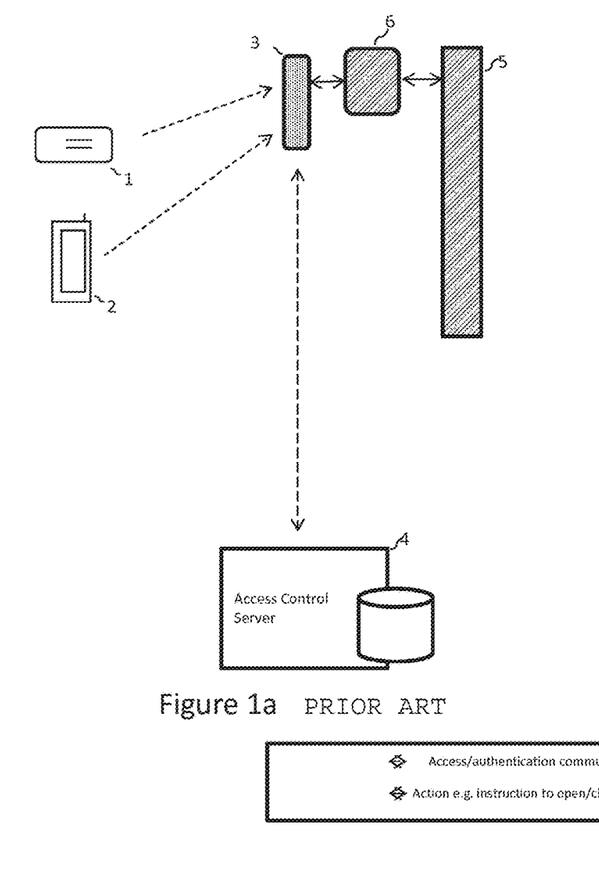
FIG. 1a is a schematic drawing of an exemplary embodiment of an access system of the prior art.

Another implementation consists in integrating the physical badge into a NFC-enabled (i.e. Near-Field-Communication enabled) phone 2. In such case, the mobile phone 2 acts as a physical badge as it holds fully an integrated circuit similar to the ones designed for the regular badge.

The state-of-art requires either the delivery of physical access badge or the ownership of a NFC-enabled device. These conditions imply an operational overhead when the access control is required only temporarily, for short-term visitors, or for a large population. Indeed the delivering authority has to welcome badge requesters, validate their request, issue the badge and handle post-delivery issues (e.g. badge loss, etc). Hence there is a need of improving the state-of-the art for providing virtual badge enabling access control without requiring the physical delivery of a badge, electronic tag or the possession of a NFC-enabled device.

The emergence of Low Throughput Networks (LTN), their wide coverage and the cheap implementation requirements offer new possibilities. LTN networks are defined in ETSI standards GS LTN 001 entitled "Low Throughput Networks (LTN); Use Cases for Low Throughput Networks", GS LTN 002 entitled "Low Throughput Networks (LTN); Functional Architecture", and GS LTN 003 entitled "Low Throughput Networks (LTN); Protocols and Interfaces". An example of an LTN network is LoRa. LoRa is a long-range, low-power, low-bitrate, wireless telecommunications system, promoted as a suitable infrastructure solution for the Internet of Things.

SUMMARY OF THE INVENTION

The object of embodiments of the invention is to provide an improved system and method for access control.

According to a first aspect there is provided a system for access control. The system comprises a plurality of mobile user devices, an access control device, typically located at the location where access need to be provided, and an access control server, which may be a remote server. The access control server is configured to send configuration data to said access control device by communicating over a Low Throughput Network. Preferably, the configuration data comprises a distinct data element and an authorization code for the access control device. The access control device is configured to receive the configuration data from the access control server by communicating over the Low Throughput Network. The mobile user device is configured to establish a communication channel with the access control device and to receive said distinct data element over said communication channel. The mobile user device is further configured to send a request containing the distinct data element in order for the access control device to receive a further authorization code determined by the access control server. The access control device is configured to compare the received further authorization code with the authorization code previously received at the access control device from the access control server, and to validate the access based on the result of the comparing.

Embodiments of the invention are useful for access control e.g. for entering private or public buildings, areas, parking, restricted zones, but also for allowing access to a certain payment system (e.g. a payment system which may only be used by employees of a certain organization) and more generally for allowing access to any zone or system that requires access control.

Preferably, the mobile user device is any one of the following: a smartphone, a tablet, a laptop, an embedded computer in a vehicle.

Preferably, the mobile user device and the access control device are configured to establish the communication channel between each other via Bluetooth and/or WiFi.

Preferably, the access control server stores user data of each mobile user device and access control device data. The user data may include any one or more of the following: an international mobile subscriber identity (IMSI), a mobile subscriber number (MSISDN), connected device information (IMEI), a medium-access-control (MAC) address of wireless interfaces, access control policies. Optionally, the access control server may store location data of the access control device.

Preferably, the access control server stores, for the access control device the distinct data element, e.g. a random number, and the authorization code.

Preferably the access control server is configured to send periodically configuration data to said access control device by communicating over a Low Throughput Network. The configuration data may comprise a sequenced array of SSID name and BSSID identifiers, the associated WLAN keys, two random numbers (RN-AP, RN2-AP), the authorization code (XRES-AP) and a Time-to-Live (TTL).

The access control server may be configured to transmit, for first-time activation, a nonce to the mobile user device; and wherein the mobile user device is configured to generate, for first-time activation, its own cnonce upon receipt of a nonce from the access control server and to sign, using the nonce and the cnonce, an activation request and to send the activation request to the access control server. Optionally, the activation request comprises data about the mobile user device and its user. The access control server may then be configured to verify whether the activation request is legitimate, and, if that is the case, to return a token to the mobile user device.

The mobile user device may be configured, for non-first-time activation, to send an activation request to the access control server. The activation request may comprise a token and data about the mobile user device and/or its user. The access control server may then be configured to verify whether the activation request is legitimate, and, if that is the case, to return a new token to the mobile user device.

Optionally, the access control device is part of an access control network comprising a plurality of access control devices. The access control server may be configured to transmit access control network information about the access control network periodically to the plurality of mobile user devices. Preferably said access control network information is time-stamped and/or is valid for a configurable time-to-live (TTL).

Optionally, the access control server may be configured to send configuration data to said access control device by communicating over a Low Throughput Network. The configuration data may comprise a first random number (RN-AP) enabling to validate the presence of the mobile user device, a second number (RN2-AP) used as a secret key for sharing information between the access control device and the access control server through the mobile user device, and a third number being the authorization code (XRES-AP), i.e. a key for granting access.

Optionally, the mobile user device is configured to transmit a radio signal strength indicator RSSI; and wherein the access control device is configured to perceive the RSSI from the mobile user device and to validate the presence and distance from the mobile user device based on the perceived RSSI; wherein preferably the RSSI is transmitted and perceived using a key.

According to another aspect of the invention there is provided an access control server, preferably for use in a system according to any one of the previous embodiments. The access control server may be configured to send configuration data to an access control device by communicating over a Low Throughput Network, said configuration data comprising a distinct data element and an authorization code for the access control device; and to receive a request containing the distinct data element and to send in response a further authorization code.

According to a further aspect of the invention, there is provided a computer program product for a mobile user device, preferably for use in a system according to any one of the previous embodiments, said computer program product being programmed to establish a communication channel with an access control device and to receive a distinct data element over said communication channel; to send a request containing the distinct data element in order for the access control device to receive a further authorization code determined by the access control server. Also there is provided a mobile user device comprising the computer program product, wherein the mobile user device may be any one of the following: a smartphone, a tablet, a laptop, an embedded computer in a vehicle.

According to another aspect there is provided an access control device, preferably for use in a system according to any one of the previous embodiments, wherein the access control device is configured to receive configuration data from an access control server by communicating over a Low Throughput Network, said configuration data comprising a distinct data element and an authorization code for the access control device; wherein the access control device is configured to establish a communication channel with a mobile user device and to send said distinct data element over said communication channel; and to compare a further received authorization code with the authorization code previously received at the access control device from the access control server and to validate the access based on the result of the comparing.

According to a further aspect there is provided a method for access control, according to claim 22.

According to another aspect of the invention, there is provided a system, a control access server, a control access device and a mobile user device according to any one of the clauses below:

1. A system for access control, said system comprising a plurality of mobile user devices, an access control device, typically located close to a location where access is required, and an access control server, typically located at a remote location, wherein
    said access control server is configured to send configuration data to said access control device;
    said access control device is configured to receive said configuration data from said access control server;
    each mobile user device is configured to establish a communication channel with the access control device and to send a request in order for the access control device to receive a further code determined by the access control server; and
    said access control device is configured to use the further code and the received configuration data in order to determine whether or not to validate the access.

2. The system of the preceding clause, wherein the mobile user device is any one of the following: a smartphone, a tablet, a laptop, an embedded computer in a vehicle.

3. The system of any preceding clause, wherein the mobile user device and the access control device are configured to establish the communication channel between each other via Bluetooth and/or WiFi.

3. The system of any preceding clause, wherein the access control device and the access control server are configured to communicate through a LTN network.

4. The system of any preceding clause, wherein the access control server stores user data of each mobile user device and access control device data, said user data preferably including any one or more of the following: an international mobile subscriber identity (IMSI), a mobile subscriber number (MSISDN), connected device information (IMEI), a medium-access-control (MAC) address of wireless interfaces, access control policies; said access control device data optionally comprising location data of the access control device.

5. The system of any preceding clause, wherein the access control server stores, for the access control device a distinct data element, e.g. a random number, and an authorization code.

6. The system of any preceding clause, wherein the access control server is configured to send periodically configuration data to said access control device; wherein the configuration data preferably comprises a sequenced array of SSID name and BSSID identifiers, the associated WLAN keys, two random numbers (RN-AP, RN2-AP), an authorization code (XRES-AP) and a Time-to-Live (TTL).

7. The system of any preceding clause, wherein the access control server is configured to transmit, for first-time activation, a nonce to the mobile user device; and wherein the mobile user device is configured to generate, for first-time activation, its own cnonce upon receipt of a nonce from the access control server and to sign, using the nonce and the cnonce, an activation request and to send the activation request to the access control server; wherein the activation request preferably comprises data about the mobile user device and its user; and wherein the access control server is configured to verify whether the activation request is legitimate, and, if that is the case, to return a token to the mobile user device, wherein said token is preferably included in the request sent by the mobile user device in order for the access control device to receive the further code.

8. The system of any preceding clause, wherein the mobile user device is configured, for non-first-time activation, to send an activation request to the access control server; wherein the activation request comprises a token and data about the mobile user device and/or its user; and wherein the access control server is configured to verify whether the activation request is legitimate, and, if that is the case, to return a new token to the mobile user device.

9. The system of any preceding clause, wherein the access control device is part of an access control network comprising a plurality of access control devices; wherein the access control server is configured to transmit access control network information about the access control network periodically to the plurality of mobile user devices; wherein preferably said access control network information is time-stamped and/or is valid for a configurable time-to-live (TTL).

10. The system of any preceding clause, wherein said access control server is configured to send configuration data to said access control device by communicating over a Low Throughput Network (501, 503, 505), said configuration data comprising a first random number (RN-AP) enabling to validate the presence of the mobile user device, a second number (RN2-AP) used as a secret key for sharing information between the access control device and the access control server through the mobile user device, and a third number being an authorization code (XRES-AP), i.e. a key for granting access.

11. The system of any preceding clause, wherein the mobile user device is configured to transmit a radio signal strength indicator RSSI; and wherein the access control device is configured to perceive the RSSI from the mobile user device and to validate the presence and distance from the mobile user device based on the perceived RSSI; wherein preferably the RSSI is transmitted and perceived using a key.

12. An access control server, preferably for use in a system according to any one of the previous clauses, wherein said access control server is configured to send configuration data to an access control device, preferably by communicating over a Low Throughput Network, said configuration data preferably comprising a distinct data element (RN-AP) and an authorization code (XRES-AP) for the access control device; and to receive a request containing the distinct data element and to send in response the further code.

13. The access control server of the preceding clause, wherein the access control server stores user data of each mobile user device and access control device data, said user data preferably including any one or more of the following: an international mobile subscriber identity (IMSI), a mobile subscriber number (MSISDN), connected device information (IMEI), a medium-access-control (MAC) address of wireless interfaces, access control policies; wherein the access control server optionally stores location data of the access control device; wherein the access control server optionally stores, for the access control device the distinct data element and the authorization code.

14. The access control server of clause 12 or 13, wherein the access control server is configured to send periodically configuration data to said access control device; wherein the configuration data preferably comprises a sequenced array of SSID name and BSSID identifiers, the associated WLAN keys, two random numbers (RN-AP, RN2-AP), the authorization code (XRES-AP) and a Time-to-Live (TTL).

15. The access control server of any preceding clause 12-14, for use with an access control network comprising a plurality of access control devices; wherein the access control server is configured to transmit access control network information about the access control network periodically to a plurality of mobile user devices; wherein preferably said access control network information is time-stamped and/or is valid for a configurable time-to-live (TTL).

16. The access control server of any preceding clause 13-16, wherein said access control server is configured to send configuration data to said access control device preferably by communicating over a Low Throughput Network, said configuration data comprising a first random number (RN-AP) enabling to validate the presence of the mobile user device, a second number (RN2-AP) used as a secret key for sharing information between the access control device and the access control server through the mobile user device, and a third number being the authorization code (XRES-AP), i.e. a key for granting access.

17. A computer program product for a mobile user device, for use in a system according to any one of the clauses 1-11, said computer program product being programmed to establish a communication channel with an access control device; and preferably to receive a distinct data element over said communication channel; to send a request containing the distinct data element in order for the access control device to receive the further code determined by the access control server.

18. A mobile user device comprising the computer program product of the preceding clause, wherein the mobile user device is any one of the following: a smartphone, a tablet, a laptop, an embedded computer in a vehicle.

19. An access control device for use in a system according to any one of the clauses 1-11, wherein the access control device is configured to receive configuration data from an access control server preferably by communicating over a Low Throughput Network; wherein the access control device is configured to establish a communication channel with a mobile user device; to receive a further code determined by the access control server; and to use the further code and the received configuration data in order to determine whether or not to validate the access.

20. The access control device of the preceding clause, wherein the access control device is configured to establish the communication channel with the mobile user device via Bluetooth and/or WiFi.

21. A method for access control, said method comprising:
  sending configuration data by an access control server to an access control device;
  establishing a communication channel between a mobile user device and the access control device; and
  sending by said mobile user device a request in order for the access control device to receive a further code determined by the access control server; and
  using the further code and the configuration data to determine whether or not to validate the access at the access control device.

Figure 1B:
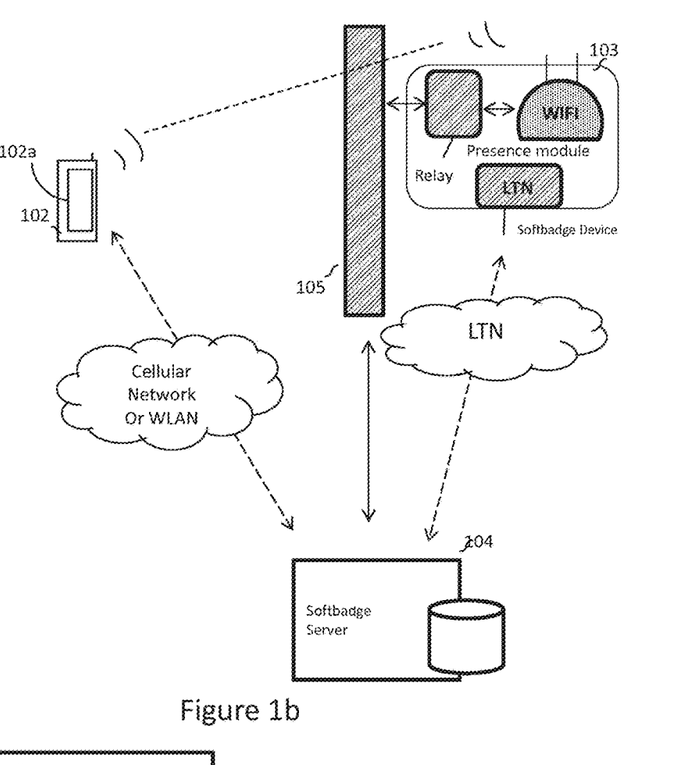
FIG. 1b is a schematic drawing of an exemplary embodiment of an access system of the invention.

An exemplary embodiment of the invention delivers a virtual badge enabling access control without requiring the physical delivery of a badge, electronic tag or the possession of a NFC-enabled device. It is called "softbadge" in this document. The softbadge guarantees the authentication of the badge owner and its presence at the point of control, as a physical badge and the associated badge reader would. The softbadge is delivered thanks to the combination of a mobile application and a BlueTooth and/or WiFi-enabled device connected to a back-end access control server thanks to a low-throughput wireless network (LTN). It offers an access control, enabling for example to open a door, a gate, a barrier, etc. The LTN implementation enables the deployment of the device softbadge without dependency of WiFi access or cost & coverage of a traditional GSM network. Thanks to their long range and low power features, LTN's enable a wide-scale deployment of the solution. However the LTN implementation imposes specific requirements on the data volume and periodicity of the exchange between the device and the back-end access control server. This is represented in FIG. 1b. An implementation example of a LTN network is a LoRaWAN network.

Optionally, the system may further have any one or more of the following features:
  the application-related data, such as app signatures and tokens, shall also be stored in the 'softbadge' application;
  the softbadge device can integrate a RFID transponder for simulating the use of access badge;
  the server compares the received information from the softbadge device, the softbadge application and the stored information for evaluating the right to access the controlled area;
  the softbadge back-end server and softbadge devices exchange periodically sensitive information over a LTN-network;

According to another exemplary embodiment there is provided a method for enabling an access control based on a virtual badge over a LTN-network where the virtual badge resides in a mobile application; the application sends an access request to the back-end server with user credentials based on the mobile equipment information (e.g. MAC addresses, IMEI, et), the user information and nonce numbers; the mobile application and the softbadge devices communicate over a secure WLAN connection whose keys and identifier are changed periodically. The update happens through the softbadge back-end server. It shares individually the key with the softbadge application over secure internet connection, while the communication with the softbadge device happens over a LTN channel.

Optionally, the method may further have any one or more of the following features:
  the access server creates 3 random numbers periodically for each softbadge device. The first random number (RN-AP) enables to validate the presence of the smartphone. The second RN2-AP is used as a secret key for sharing sensitive information between the softbadge device and the back-end server through the softbadge application, the last one is the final key granting access;
  the presence and distance from the module is also validated thanks to the radio signal strength indicator (RSSI) perceived at the softbadge device. The RSSI is shared secretly thanks to the use of the RN2-AP key;
  the access server evaluates the access rights associated with the virtual badge for providing access to the requester;
  the wireless modules may activate its transponder in place for facilitating the introduction of the virtual badge into an existing badge system and for exchanging the identity of the subscriber to the reader.

According to a further aspect of the invention, there is provided a computer program comprising computer-executable instructions to perform, when the program is run on a computer, any one or more of the method steps of any one of the embodiments disclosed above.

According to a further aspect of the invention, there is provided a computer device or other hardware device programmed to perform one or more steps of any one of the embodiments of the method disclosed above. According to another aspect there is provided a data storage device encoding a program in machine-readable and machine-executable form to perform one or more steps of any one of the embodiments of the method disclosed above.

BRIEF DESCRIPTION OF THE DRAWINGS

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF THE DRAWINGS

The drawings are only schematic and are non-limiting. Any reference signs in the claims shall not be construed as limiting the scope. In the drawings, the same reference signs refer to the same or analogous elements.

An exemplary embodiment of a system for access control of the invention, also called LTN-softbadge system is illustrated in FIG. 1b. The system comprises multiple components:
  an application 102a in a mobile user device 102, e.g. a smartphone, a tablet, a laptop, an embedded computer (e.g. in a car) or any other mobile device, preferably with a bluetooth and/or a WiFi radio access to request access to an access control device 103 e.g. connected to an access-controlled door, gate or zone 105. The application is called hereafter 'softbadge application'.
  An access control device 103, e.g. a WiFi and/or Bluetooth access point module, called hereafter a 'softbadge device', at an access-controlled location. The access control device acts as a presence and authentication sensor by communicating with the softbadge application and an access control back-end server 104, hereafter called the 'softbadge server'.

An access control server 104 holding a database for storing access control device information and other meaningful information about the softbadge application, the mobile and owner details as, for example, the mobile subscriber number (MSISDN), the connected device information (IMEI), the medium-access-control (MAC) addresses (also known as the BSSID) of the wireless interfaces, access control policies, etc. The database may also contain a location reference database with the locations of the softbadge devices. Application-related data may also be stored in the database, for example, app signatures and tokens, etc. As mentioned above the access control server with database is called "softbadge server".

An optional operation control console providing a reporting engine and various operational interfaces to the badge service provider.

Figure 2:
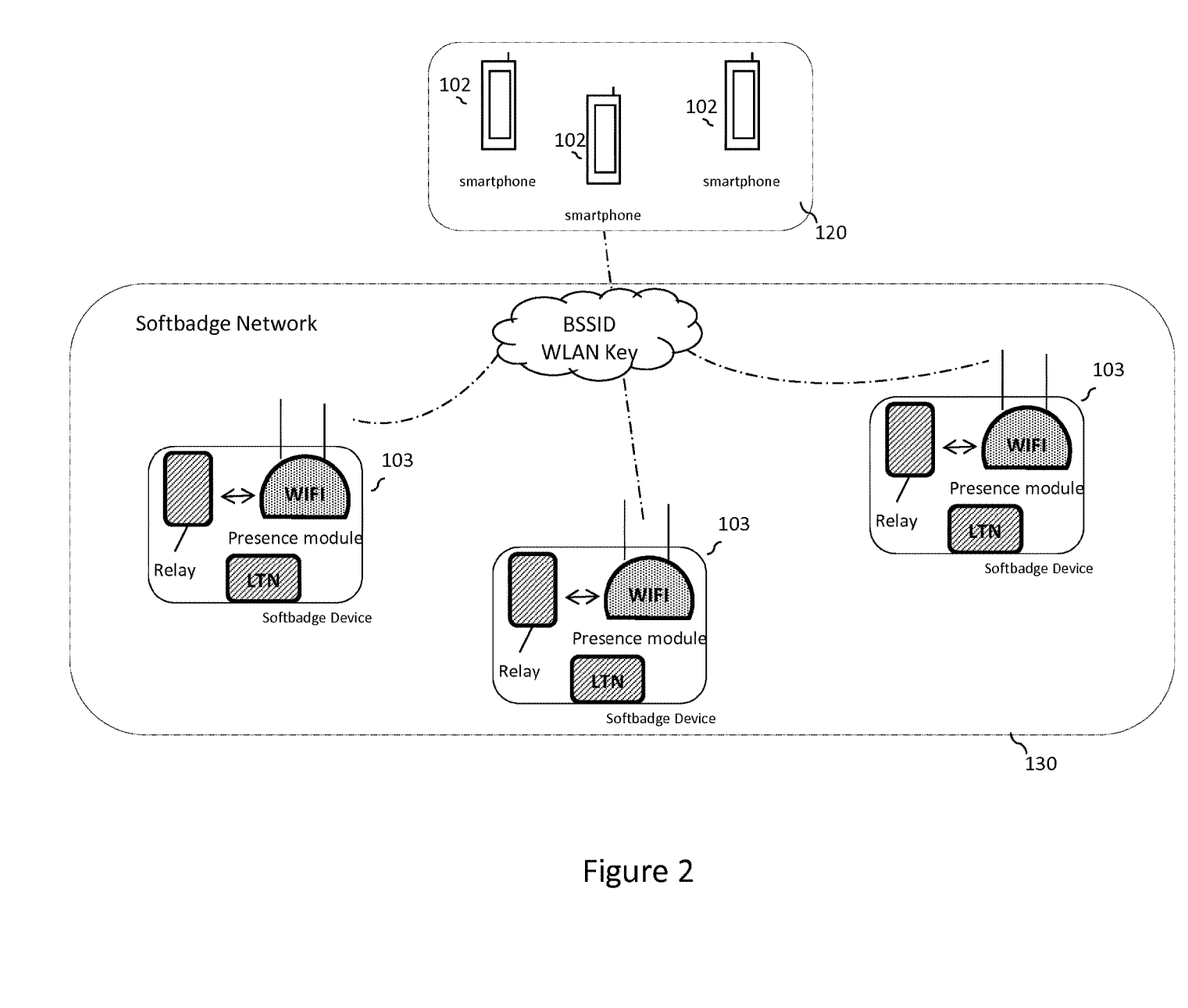
FIG. 2 illustrates schematically the concept of having a softbadge network in an exemplary embodiment of an access system of the invention.

FIG. 2 illustrates the concept of 'softbadge network'. A group 'softbadge devices' 103 serving a same organization is called a 'softbadge network' 130. Preferably, the softbadge devices 103 belonging to a same 'softbadge network' 130 publish a same BSSID with the same key. The softbadge device 103 may broadcast multiple SSIDs and associated key (e.g. the currently applied and the previous one for example).

FIGS. 4a and 4b, 5 and 6 show details about the technical flows ensuring a bulletproof access control with an exemplary embodiment of a softbadge system of the invention.

Figure 5:
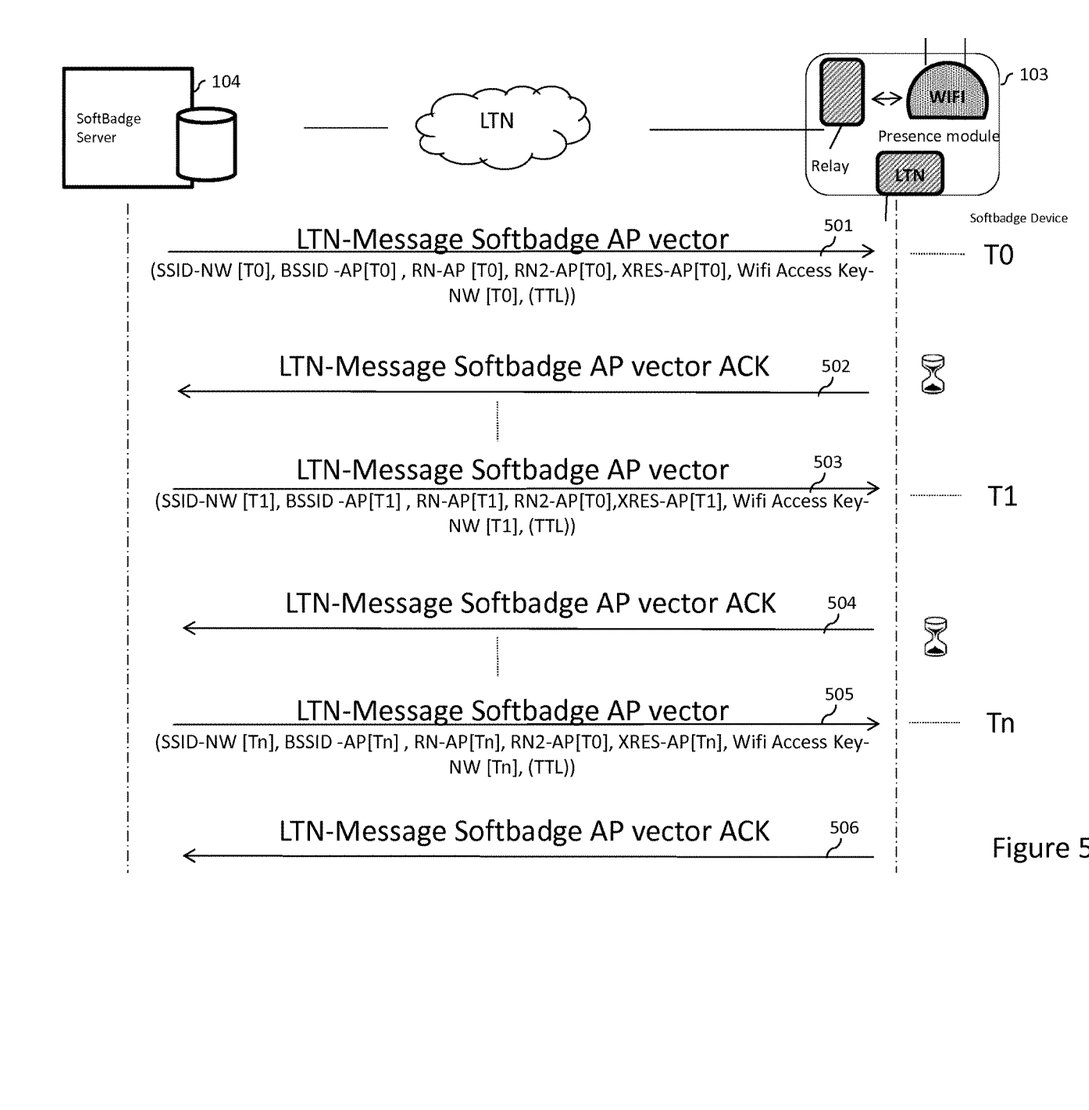
FIG. 5 is a diagram showing a technical flow for the management of a softbadge device in accordance with an exemplary embodiment.
Figure 6:
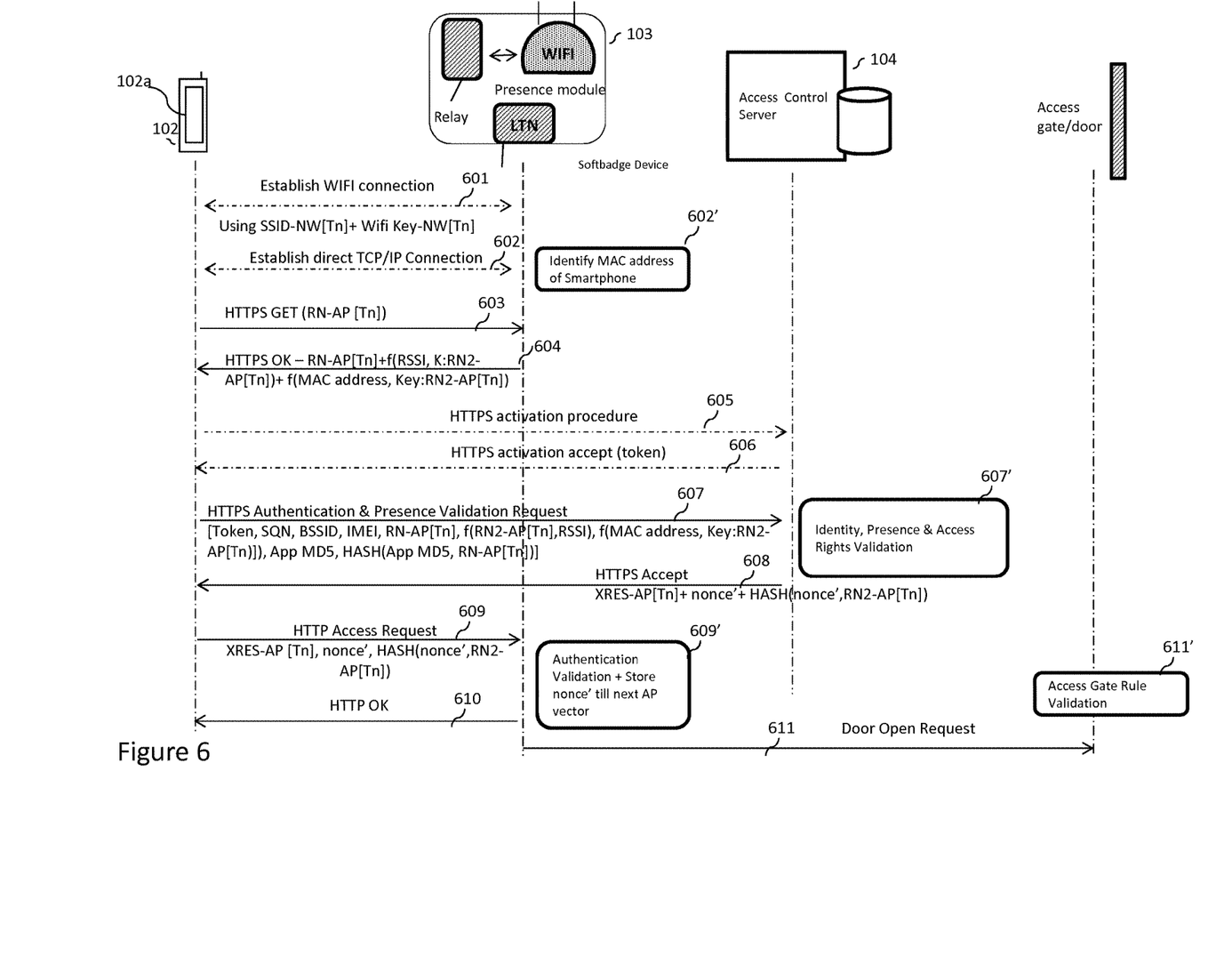
FIG. 6 is a diagram showing a technical flow illustrating the message exchanges for allowing access in accordance with an exemplary embodiment.

The process may be split into three phases: the activation and use of the softbadge application (FIGS. 4a and 4b), the periodic configuration of the softbadge device (FIG. 5), the validation of the identity and presence of the user (FIG. 6). These three phases will be discussed below.

Validation of the User Identification

The mobile device user employs the 'softbadge application' for requesting the access to the controlled door or gate. First, in order to be able to use the system, a user will perform a registration procedure and will receive a 'nonce' produced by the softbadge server, see steps 400 and 401 in FIG. 4a. The mode of transmission of the nonce may vary, although it preferably ensures an end-user authentication. Typical implementations are via email, via SMS to the MSISDN registered by the user, via an e-ID, direct human interaction, etc.

In order to get activated, the softbadge application sends an activation request to the access control server 104, as will be further detailed below. The flows for first-time activation and re-activation are represented respectively in FIGS. 4a and 4b.

Figure 4A:
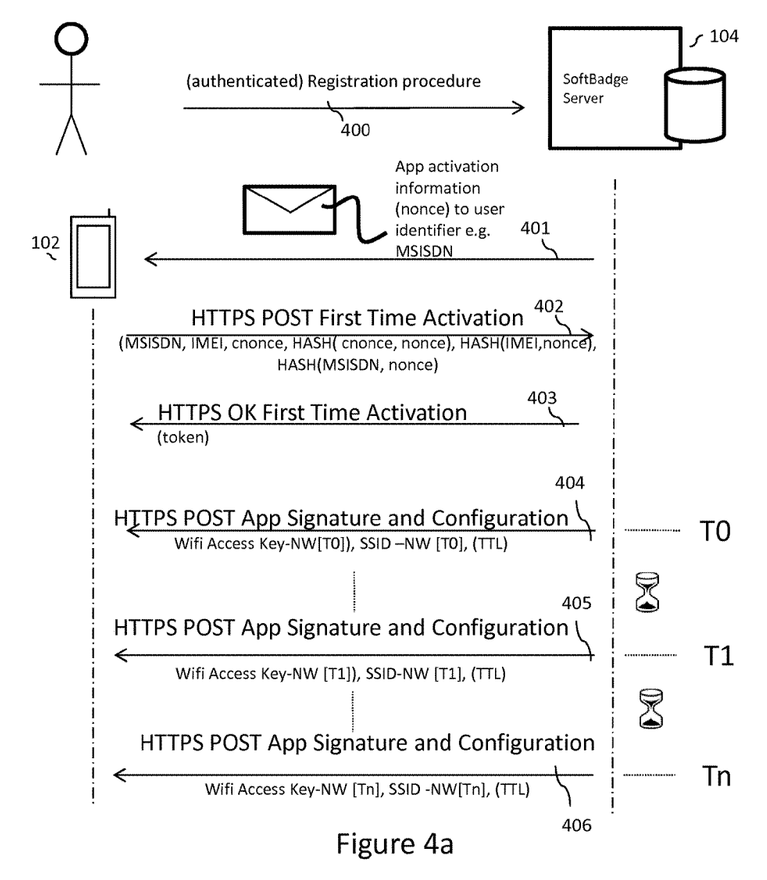
FIG. 4a is a diagram showing a technical flow for the first-time activation of a softbadge application of a mobile user device in accordance with an exemplary embodiment.

As illustrated in FIG. 4a, at the first time of activation, the mobile user device 102 generates its own 'cnonce' upon receipt of a nonce from the softbadge server 104, see steps 401 and 402. The nonce and cnonce are used for signing an activation request message which is sent from mobile user device 102 to softbadge server 104, see step 402. Further, the exchanged information contains detailed information about the mobile user device and its user (e.g. IMEI, IMSI, MSISDN, . . . ), see step 402. Based on this information set, the softbadge server 104 validates whether the request is legitimate. If the request is legitimate, it will return a token to the application, see step 403. The whole transaction preferably happens over a secure path, e.g. HTTPS. The activation procedure may be repeated over time for refreshing the token.

Figure 4B:
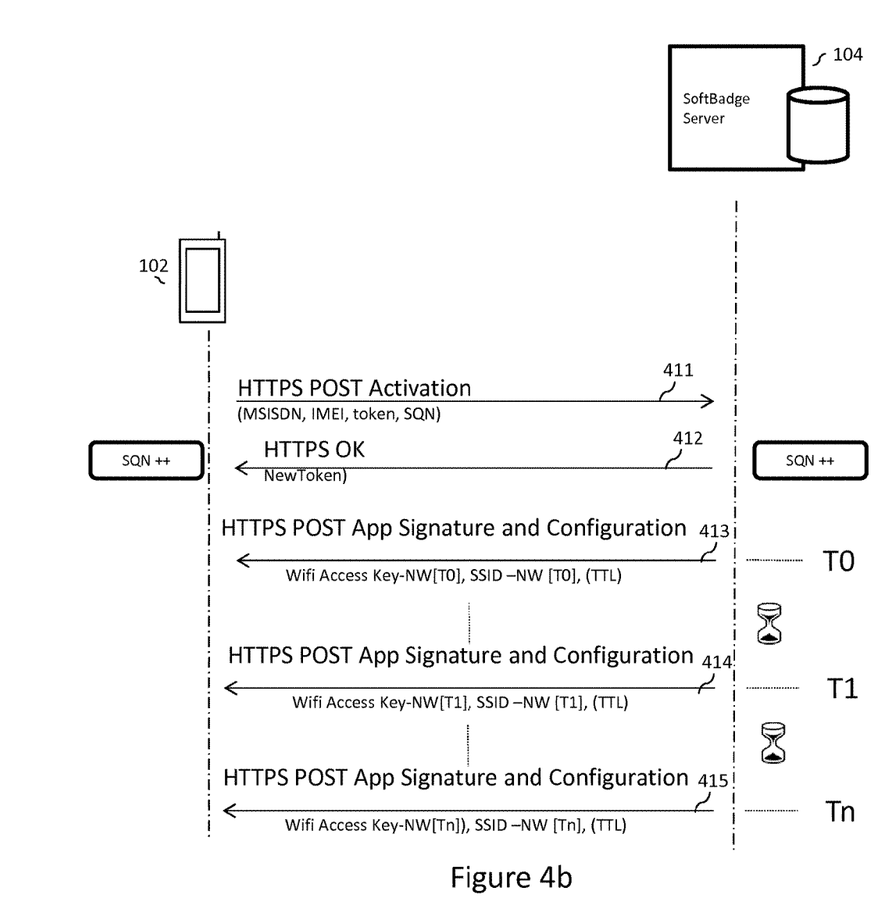
FIG. 4b is a diagram showing a technical flow for the management of a softbadge application of a mobile user device in accordance with an exemplary embodiment.

As illustrated in FIG. 4b, when, at a later moment in time the softbadge application 102a restarts, the procedure may be shortened. The softbadge application shares directly the token in combination with its identifiers (e.g. the MSISDN, the IMEI, . . . ), see step 411. In response the softbadge server 104 sends a new token, see step 412. An activation sequence number may be incremented at both sides, i.e. at the softbadge application side and at the softbadge server side, for tracking and validating the access requests.

Once the application is successfully activated, the softbadge server shares information (e.g. BSSID and Network key) periodically about the authorized softbadge networks 130 (see also FIG. 2) to the access-granted mobile user devices 102, see steps 404-406 in FIG. 4a and steps 413-415 in FIG. 4b. The information shared may be time-stamped and is typically valid for a configurable time-to-live (TTL).

The access to the softbadge application itself may be protected by a login/password, a One-Time-Passwords (OTP) mechanism, a PIN code, etc.

Dynamic Configuration of the Softbadge Device

Figure 3:
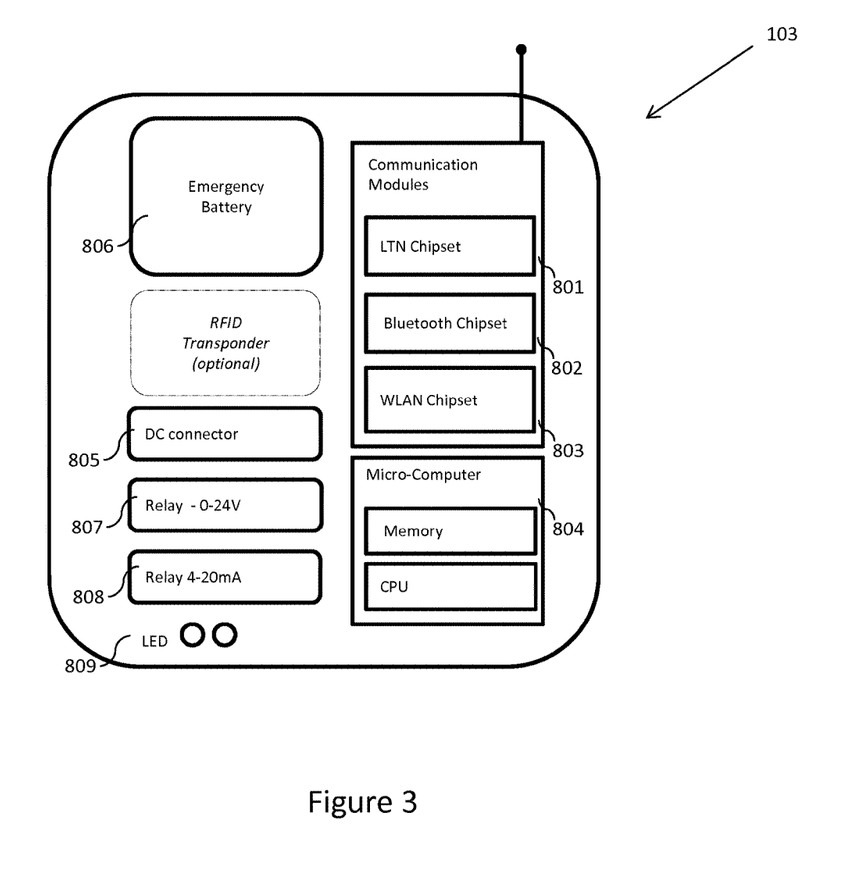
FIG. 3 illustrates schematically an exemplary embodiment of an access control device of the invention.

An exemplary embodiment of a softbadge device is represented in FIG. 3. The softbadge device 103 may comprise various communication modules: a LTN-radio module 801 (e.g. a SX1272 module enabling LoRaWAN communication), a WLAN module 803 and/or a Bluetooth Module 802. The softbadge device 103 is built around a micro-computer unit 804 that includes a CPU and a memory bank, enabling the implementation of the softbadge device logic. The softbadge device may further comprise a power input 805, an emergency battery 806, and controllable relays 807, 808 in order to actuate (e.g. open, unlock, etc.) a closure element such as a door, a gate, etc. LEDs 809 are optionally present to indicate the softbadge status.

As illustrated in FIG. 5, in order to secure the access to the softbadge devices 103, the softbadge back-end server 104 sends periodically a configuration vector, called "softbadge AP vector" to the softbadge device 103 over the LTN network, see steps 501, 503, 505. Upon receipt of the softbadge AP vector, the softbadge device 103 typically sends an acknowledgement message, see steps 502, 504 and 506. Because the LTN usually imposes strong limitation in terms of bandwidth, payload size and duty cycle, the softbadge AP vector contains limited information, e.g. a sequenced array of SSID name and BSSID identifiers, the associated WLAN keys, two random numbers (RN-AP, RN2-AP), the authorization code (XRES-AP) and a Time-to-Live (TTL). The size of the softbadge AP vector and the number of arrays sent depends on the LTN network. For sake of simplicity, a single array is represented in FIG. 5. However if a LoRaWAN implementation is used, typically three arrays are used. An array is only valid for a limited time, thanks to a Time-To-Live control. In case of Bluetooth support, the vector may also contain the pairing code and the MAC Address and visible Name of the softbadge device 103.

In another non-illustrated embodiment a "mirrored" implementation may be used where the softbadge device 103 queries the softbadge server 104 and receives a similar configuration vector. In such an embodiment, when LoRa is used as the LTN, a listening device is called a LoRa Class C device, and a sending device is called a LoRa Class A device.

The softbadge device 103 reconfigures its WLAN and/or Bluetooth interface in accordance with the parameters received. While the WLAN and Bluetooth key are common to all softbadge devices 103 of a same softbadge network 130, the Random Numbers (RN-AP and RN2-AP) and XRES-AP are computed distinctly for each softbadge device 103.

Access Control Validation

FIG. 6 illustrates the multiple steps required to be fulfilled in order to have access granted in accordance with an exemplary embodiment of the softbadge system.

The first step 601 is to establish a communication channel between the softbadge device 103 and the softbadge application 102a. This may be done either with a Bluetooth pairing, or by establishing a WLAN connection using the SSID of the softbadge network 130 and the associated key currently in use. In order to cope with update failures, the softbadge device 103 may be configured to accept a connection (e.g. WLAN or Bluetooth) using a previous wireless access dataset.

The connection between the softbadge device 103 and the mobile user device 102 preferably happens over a secured link. The key length may be 128- or 256-bits securing the communication channel between the softbadge device 103 and the mobile user device 102. This is a first level of authentication. Only mobile user devices belonging to the organization owning to softbadge network 130 shall be able to connect to the softbadge devices 103.

Once the connection is established, the softbadge device 103 can have information about the MAC address of the network interface at the application side, see step 602 and 602'. Next, the softbadge application 102a requests the softbadge device 103 the first Random Number (RN-AP) of the softbadge AP vector, see step 603. The softbadge device 103 returns the requested number accompanied of a RSSI (i.e. the Radio Signal Strength Indicator, providing a representation of the signal power at the device antenna) ciphered using the second latest Random Number (RN2-AP) as symmetric key, see step 604. The softbadge device 103 also returns the MAC address of the mobile user device 102 read from the WLAN interface and ciphered with the same RN2-AP symmetric key.

An optional activation procedure may be implemented at this stage, see steps 605, 606. The newly generated token is then used by the softbadge application 102a.

The softbadge application 102a uses the information provided by the softbadge device 103 for requesting authorization access to the softbadge server 104, see step 607. The softbadge server 104 is able to authenticate the user request thanks to the token and deciphering the MAC address. It may validate the location thanks to the RN-AP number provided and the presence deciphering the RSSI. Additional control on the softbadge application integrity is possible by verifying the MD5 hash. See step 607'. Further, the softbadge server 104 can check access rules internally or interacting with a policy server (not illustrated).

In case the access is granted, the softbadge server 104 returns a XRES-AP code with a nonce number (nonce' in FIG. 6), see step 608. The nonce number nonce' prevents from replaying the authorization code. The nonce number may be provided after hashing with the RN2-AP. Next, the mobile device 102 requests the softbadge device 103 to actuate (e.g. open a door) by sharing the received information (XRES-AP, nonce and its HASH), see step 609. The softbadge device 103 compares the XRES-AP with the expected value and verifies that the nonce number is new, see step 609'. The nonces are stored only temporarily (deletion occurs when new softbadge AP vector or array are used). If the authentication validation was successful in step 609', an OK message is sent in step 610 from the softbadge device 103 to the mobile user device 102.

In the exemplary embodiments above HTTP(S) is used as the application protocol for the data communication between the softbadge application 102a and the softbadge device 103, and between the softbadge application 102a and the softbadge server 104. A skilled person would understand this is merely the information container and that any other similar protocol may be used.

Figure 7:
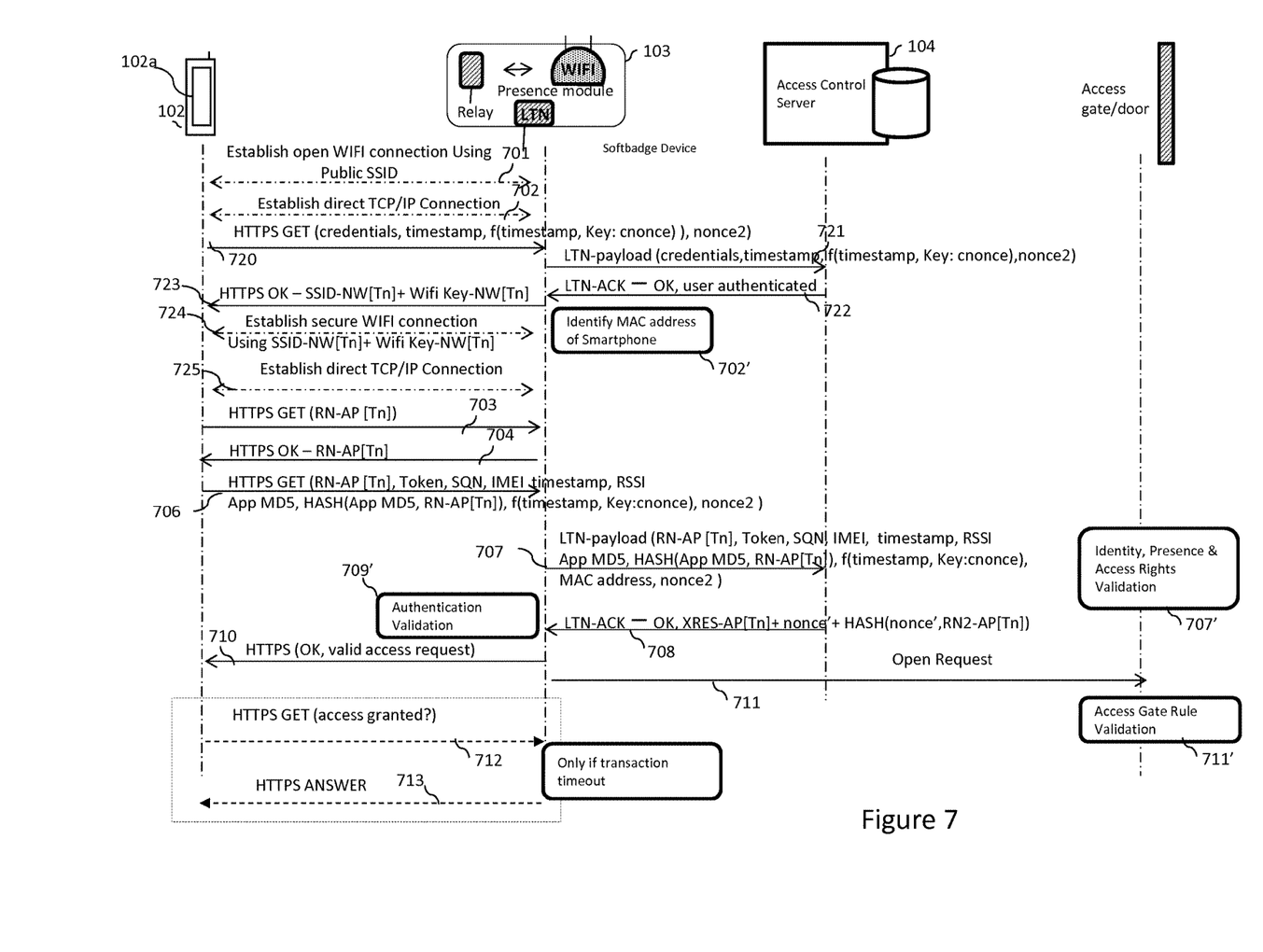
FIG. 7 is a diagram showing a technical flow illustrating the message exchanges for allowing access in accordance with another exemplary embodiment.

FIG. 7 illustrates a variant of FIG. 6 illustrating the multiple steps required to be fulfilled in order to have access granted in accordance with an exemplary embodiment of the softbadge system. The first step 701 is to establish a communication channel between the softbadge device 103 and the softbadge application 102a, here a Wifi connection using a public SSID. Next in step 702 a direct TCP/IP connection is established. In step 720-723 a Wifi key is obtained, and in step 724 a secure WiFi connection is established using the SSID of the softbadge network 130 and the associated key. In step 725 a direct TCP/IP connection is established.

Once the secure connection is established, the softbadge device 103 can have information about the MAC address of the network interface at the application side, see step 702'. Next, the softbadge application 102a requests the softbadge device 103 the first Random Number (RN-AP) of the softbadge AP vector, see step 703. The softbadge device 103 returns the requested number, see step 704.

The softbadge application 102a uses the information provided by the softbadge device 103 for requesting authorization access to the softbadge server 104, see steps 707-708. The softbadge server 104 is able to authenticate the user request thanks to the token and deciphering the MAC address. It may validate the location thanks to the RN-AP number provided and the presence deciphering the RSSI. Additional control on the softbadge application integrity is possible by verifying the MD5 hash. See step 707'. Further, the softbadge server 104 can check access rules internally or interacting with a policy server (not illustrated).

In case the access is granted, the softbadge server 104 returns a XRES-AP code with a nonce number (nonce' in FIG. 7), see step 708. The nonce number nonce' prevents from replaying the authorization code. The nonce number may be provided after hashing with the RN2-AP. The softbadge device 103 performs validation, see step 709'. If the authentication validation was successful in step 709', an OK message is sent in step 710 from the softbadge device 103 to the mobile user device 102, and an open request is transmitted from the softbadge device 103 to the access gate or door, see steps 711 and 711'. Optionally further steps 712 and 713 may be performed.

In an alternative (non-illustrated) embodiment, instead of sending the authorization code in step 708, the authentication validation of 709' could be done in the softbadge server and in step 708 there could be sent a further code indicating that the authentication performed in the softbadge server was successful. This corresponds with an exemplary embodiment of what is described in the clauses in the description. However, such an embodiment is usually less secure.

In the exemplary embodiments above HTTP(S) is used as the application protocol for the data communication between the softbadge application 102a and the softbadge device 103, and between the softbadge application 102a and the softbadge server 104. A skilled person would understand this is merely the information container and that any other similar protocol may be used.

In a possible embodiment, the softbadge application needs to communicate to the softbadge device and to the softbadge server. In such implementation, the application typically requires an active routing management in order to ensure relevant information is sent to the right destination.

Emulation of an Access Badge

In order to facilitate the integration of the proposed invention within existing deployed badge-based access control, the softbadge module may integrate a RFID transponder. The transponder can respond to the RFID reader beacons with the user identity. In other words, the system is able to emulate the use of a standard badge. In such case the softbadge server 104 may share the RFID information to be shared upon access grant.

Whilst the principles of the invention have been set out above in connection with specific embodiments, it is to be understood that this description is merely made by way of example and not as a limitation of the scope of protection which is determined by the appended claims.

The invention claimed is:

1. A system for access control, said system comprising a plurality of mobile user devices, an access control device and an access control server, wherein:
said access control server is configured to send configuration data to said access control device by communicating over a Low Throughput Network, said configuration data comprising a distinct data element and an authorization code for the access control device;
said access control device is configured to receive said configuration data from said access control server by communicating over the Low Throughput Network;
each mobile user device is configured to establish a communication channel with the access control device and to receive said distinct data element over said communication channel and to send a request containing the distinct data element in order for the access control device to receive a further authorization code determined by the access control server; and
said access control device is configured to compare the received further authorization code with the authorization code previously received at the access control device from the access control server and to validate the access based on the result of the comparing.

2. The system of claim 1, wherein the mobile user device is any one of the following: a smartphone, a tablet, a laptop, an embedded computer in a vehicle.

3. The system of claim 1, wherein the mobile user device and the access control device are configured to establish the communication channel between each other via Bluetooth and/or WiFi.

4. The system of claim 1, wherein the access control server stores user data of each mobile user device and access control device data, said user data preferably including any one or more of the following: an international mobile subscriber identity, a mobile subscriber number, connected device information, a medium-access control address of wireless interfaces, access control policies.

5. The system of claim 1, wherein the access control server stores location data of the access control device.

6. The system of claim 1, wherein the access control server stores, for the access control device the distinct data element, e.g. a random number, and the authorization code.

7. The system of claim 1, wherein the access control server is configured to send periodically configuration data to said access control device by communicating over the Low Throughput Network wherein the configuration data preferably comprises a sequenced array of SSD name and BSSID identifiers, the associated WLAN keys, two random numbers, the authorization code and a Time-to-Live.

8. The system of claim 1, wherein the access control server is configured to transmit, for first-time activation, a nonce to the mobile user device; and wherein the mobile user device is configured to generate, for first-time activation, its own cnonce upon receipt of a nonce from the access control server and to sign, using the nonce and the cnonce, an activation request and to send the activation request to the access control server, wherein the activation request preferably comprises data about the mobile user device and its user; and wherein the access control server is configured to verify whether the activation request is legitimate, and, if that is the case, to return a token to the mobile user device.

9. The system of claim 1, wherein the mobile user device is configured, for non-first-time activation, to send an activation request to the access control server; wherein the activation request comprises a token and data about the mobile user device and/or its user; and wherein the access control server is configured to verify whether the activation request is legitimate, and, if that is the case, to return a new token to the mobile user device.

10. The system of claim 1, wherein the access control device is part of an access control network comprising a plurality of access control devices; wherein the access control server is configured to transmit access control network information about the access control network periodically to the plurality of mobile user devices; wherein preferably said access control network information is time-stamped and/or is valid for a configurable time-to-live.

11. The system of claim 1, wherein said access control server is configured to send configuration data to said access control device by communicating over the Low Throughput Network, said configuration data comprising a first random number enabling to validate the presence of the mobile user device, a second number used as a secret key for sharing information between the access control device and the access control server through the mobile user device, and a third number being the authorization code, i.e. a key for granting access.

12. The system of claim 1, wherein the mobile user device is configured to transmit a radio signal strength indicator RSSI; and wherein the access control device is configured to perceive the RSSI from the mobile user device and to validate the presence and distance from the mobile user device based on the perceived RSSI; wherein preferably the RSSI is transmitted and perceived using a key.

13. The system according to claim 1, wherein said access control server is configured to send configuration data to the access control device by communicating over the Low Throughput Network, said configuration data comprising the distinct data element and the authorization code for the access control device; and to receive the request containing the distinct data element and to send in response the further authorization code.

14. The access control server of claim 13, wherein the access control server stores user data of each mobile user device and access control device data, said user data preferably including any one or more of the following: an international mobile subscriber identity, a mobile subscriber number, connected device information, a medium-access-control address of wireless interfaces, access control policies; wherein the access control server optionally stores location data of each mobile user device; wherein the access control server optionally stores, for the access control device the distinct data element, and the authorization code.

15. The access control server of claim 13, wherein the access control server is configured to send periodically configuration data to said access control device by communicating over the Low Throughput Network; wherein the configuration data preferably comprises a sequenced array of SSID name and BSSID identifiers, the associated WLAN keys, two random numbers, the authorization code and a Time-to-Live.

16. The access control server of claim 13, for use with an access control network comprising a plurality of access control devices; wherein the access control server is configured to transmit access control network information about the access control network periodically to a plurality of mobile user devices; wherein preferably said access control network information is time-stamped and/or is valid for a configurable time-to-live.

17. The access control server of claim 13, wherein said access control server is configured to send configuration data to said access control device by communicating over the Low Throughput Network, said configuration data comprising a first random number enabling to validate the presence of the mobile user device, a second number used as a secret key for sharing information between the access control device and the access control server through the mobile user device, and a third number being the authorization code i.e. a key for granting access.

18. The system for access control according to claim 1 further comprising a computer program product for at least one of the plurality of mobile user devices, said computer program product being programmed to establish the communication channel with the access control device and to receive the distinct data element over said communication channel to send the request containing the distinct data element in order for the access control device to receive the further authorization code determined by the access control server.

19. The system for access control according to claim 1, wherein the access control device is configured to receive configuration data from the access control server by communicating over the Low Throughput Network, said configuration data comprising the distinct data element and the authorization code for the access control device; wherein the access control device is configured to establish the communication channel with at least one of the plurality of mobile user devices and to send said distinct data element over said communication channel and to compare the further received authorization code with the authorization code previously received at the access control device from the access control server and to validate the access based on the result of the comparing.

20. The access control device of claim 19, wherein the access control device is configured to establish the communication channel with the mobile user device via Bluetooth and/or WiFi.

* * * * *